US008017374B2

(12) United States Patent
Kumar et al.

(10) Patent No.: US 8,017,374 B2
(45) Date of Patent: Sep. 13, 2011

(54) PROCESSES FOR DECOLORIZATION OF COLORED EFFLUENTS

(75) Inventors: Chandralata Raghu Kumar, Goa (IN); Donna Trella D'Souza Ticlo, Goa (IN)

(73) Assignee: Council of Scientific and Industrial Research, New Delhi (IN)

( * ) Notice: Subject to any disclaimer, the term of this patent is extended or adjusted under 35 U.S.C. 154(b) by 474 days.

(21) Appl. No.: 10/570,749

(22) PCT Filed: Feb. 12, 2005

(86) PCT No.: PCT/IN2005/000396

§ 371 (c)(1),
(2), (4) Date: Nov. 12, 2007

(87) PCT Pub. No.: WO2006/059348

PCT Pub. Date: Jun. 8, 2006

(65) Prior Publication Data

US 2008/0057567 A1    Mar. 6, 2008

(51) Int. Cl.
*C12N 1/00* (2006.01)
(52) U.S. Cl. .................................. 435/254.1
(58) Field of Classification Search .......... None
See application file for complete search history.

(56) References Cited

U.S. PATENT DOCUMENTS

| 5,091,089 | A | 2/1992 | Shen et al. |
| 6,395,534 | B1 | 5/2002 | Raghukumar et al. |
| 6,613,559 | B2 * | 9/2003 | Raghukumar et al. ...... 435/262.5 |

FOREIGN PATENT DOCUMENTS

| DE | 290004 | 5/1991 |
| WO | WO 92/17550 | 10/1992 |
| WO | WO 03/035661 | 5/2003 |

OTHER PUBLICATIONS

Pointing et al., World Journal of Microbiology & Biotechnology, 2000, vol. 16, p. 199-205.*
GenBank, AY187277—basidiomycete sp. HKUCC 4062, p. 1-2.*
Galhaup et al., Microbiology, 2002, vol. 148, 2159-2169.*
Abadulla et al., Applied and Environmental Microbiology, 2000, vol. 66, No. 8, p. 3357-3362.*
Spencer et al., Biotechnology and Bioengineering, 1973, vol. XV, p. 1-12.*
Agrawal et al., Soil pollution by spent was discharge: depletion of manganese(II) and impairment of its oxidation. *Journal of Environmental Biology* 15:49-53, 1994.
Ali et al., Aquatic toxicity from pulp and paper mill effluents: a review. *Advances in Environmental Research* 5:175-196, 2001.
Bajpai et al., Decolorization of Kraft bleach plant effluent with the white-rot fungus *Trametes versicolor*. *Process in Biochemistry* 28:377-384, 1993.
Bajpai et al., Biological color removal of pulp and paper millwaste waters. *Journal of Biotechnology* 33:211-220, 1994.
Belsare et al., Decolorization of effluent from the bagasse-based pulp mills by white-rot fungus, *Schizophyllum commune*. *Appl Microbiol Biotechnol* 28:301-304, 1988.
Dilek et al., Colour and AOX removal from pulping effluents by algae. *Applied and Environmental Microbiology* 52:585-591, 1999.
Fitzgibbon et al., Biological treatment of distillery waste for pollution-remediation. *Journal of Basic Microbiology* 35(5):293-301, 1995.
Fu et al., Fungal decolorization of dye wastewaters: a review. *Bioresource Technology* 79:251-262, 2001.
Kannan, Decolorization of pulp and paper mill effluent by growth of *Aspergillus niger*. *World Journal of Microbiology and Biotechnology* 62:114-116, 1990.
Kim, S. B., et al., Decolorization and degradation products of melonoidin by active oxygen. *Bulletin of Korean Fisheries Society* 19:36-44, 1986.
Michel, Jr., et al., Role of manganese peroxidases and lignin peroxidases of *Phanerochaete chrysosporium* in the decolorization of kraft bleach plant effluent. *Applied and Environmental Microbiology* 57(8):2368-2375, 1991.
Ohmomo et al., Decolorization of molasses waste water by a thermophilic stran, *Aspergillus fumigatus* G-2-6. *Agric. Biol. Chem.* 51(12):3339-3346, 1987.
Prasad et al., Color removal from Kraft bleach plant effluents by *Trichoderma* sp. *TAPPI Journal* 74:165-169, 1991.
Prasad et al., Sequential treatment of El stage Kraft bleach plant effluent. *Bioresources and Technology* 44:141-147, 1993.
Pugh et al., Bioremediation of contaminated soil and groundwater at a former solvent storage site. In: Biotechnology in Industrial Waste Treatment and Bioremediation (eds. Hickey RF and Smith G) CRC Press Incl: 195-212, 1996. Rahaman, A. A. et al., Distillery effluent treatment using *Artemia*. *Indian Journal of Experimental Biology* 30:313-316, 1992.
Raghukumar et al., Degradation of lignin and decolorization of paper mill bleach plant effluent (BPE) by marine fungii. *Biotechnology Letters* 18(1):105-106, 1996.
Reddy, C. A., The potential for white-rot fungi in the treatment of pollutants. *Current Opinion in Biotechnology* 6:320-328, 1995.

(Continued)

*Primary Examiner* — Kade Ariani
(74) *Attorney, Agent, or Firm* — The McCallum Law Firm, P.C.; Jennifer M. McCallum, Esq.

(57) ABSTRACT

The present invention relates to a novel process for decolorization of colored effluents. More particularly it relates to a process for decolorization of colored effluents of textile mills, dye-making industries, paper and pulp industries and molasses spent wash from alcohol distilleries using an unidentified white-rot marine fungus NIOCC #2a isolated from mangrove wood and deposited on Sep. 7, 2004 in the microbial type culture collection (MTCC) of the Institute of Microbial Technology, Chandigarh, India, under the accession number MTCC 5159. Further, this invention relates to decolorization of these effluents using the fungus directly, its cell-free culture supernatant or immobilized fungus or extracellular polymeric substances produced by the fungus. Furthermore, the decolorization of effluents can be carried out from 30° C. to 60° C. and at pH 3 to 6. The decolorization of various colored effluents occurs in the presence of sea water with 25 parts per thousand salinity. Several synthetic dyes are also decolorized under similar conditions of temperature and pH by using free mycelia or immobilized fungus or extracellular culture fluids or extracellular polymeric substances.

17 Claims, 5 Drawing Sheets

OTHER PUBLICATIONS

Rodriguez et al., Industrial dye decolorization by laccases from ligninolytic fungi. *Current Microbiology* 38(1):27-32, 1999.

Sirianuntapiboon et al., Screening of filamentous fungi having the ability to decolorize molasses pigments. *Agric. Biol. Chem.* 52(2):387-392, 1988.

Wedzicha et al., Melanoidins from glucose and glycine: composition, characteristics and reactivity towards sulphite ion. *Food Chemistry* 43:359-367, 1992.

* cited by examiner

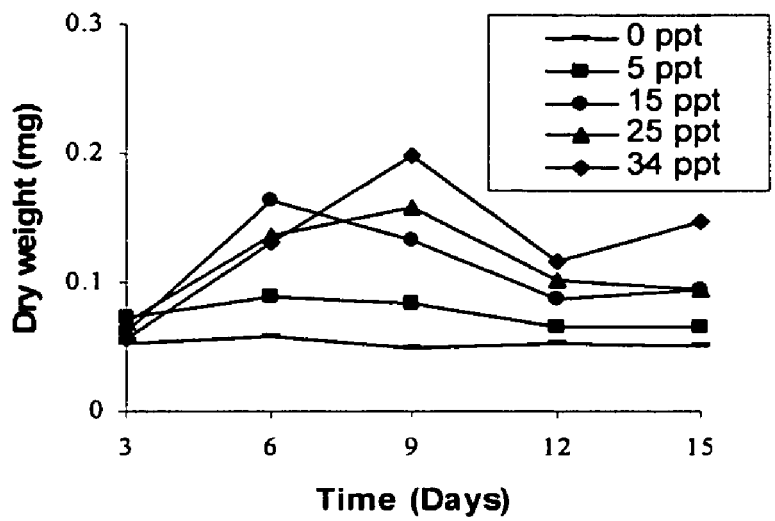
Fig 1a Fungal biomass production at varying salinities
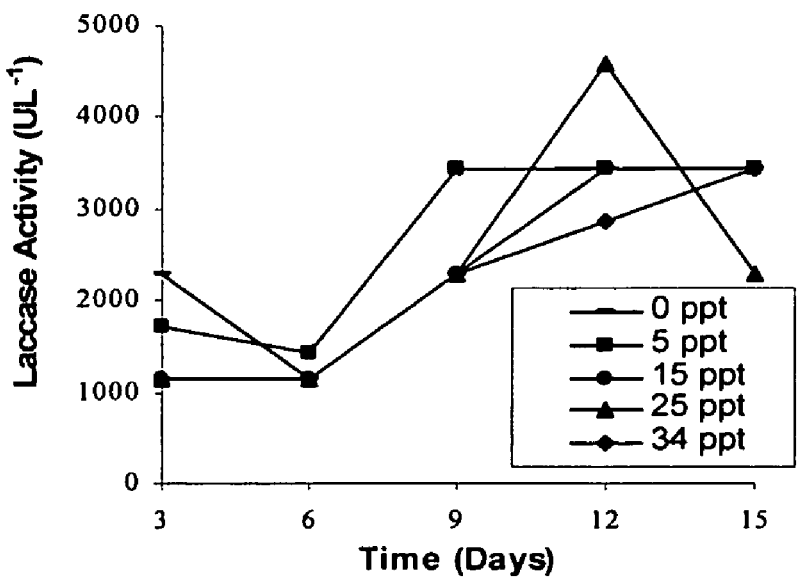
Fig 1b Fungal Laccase production at varying salinities

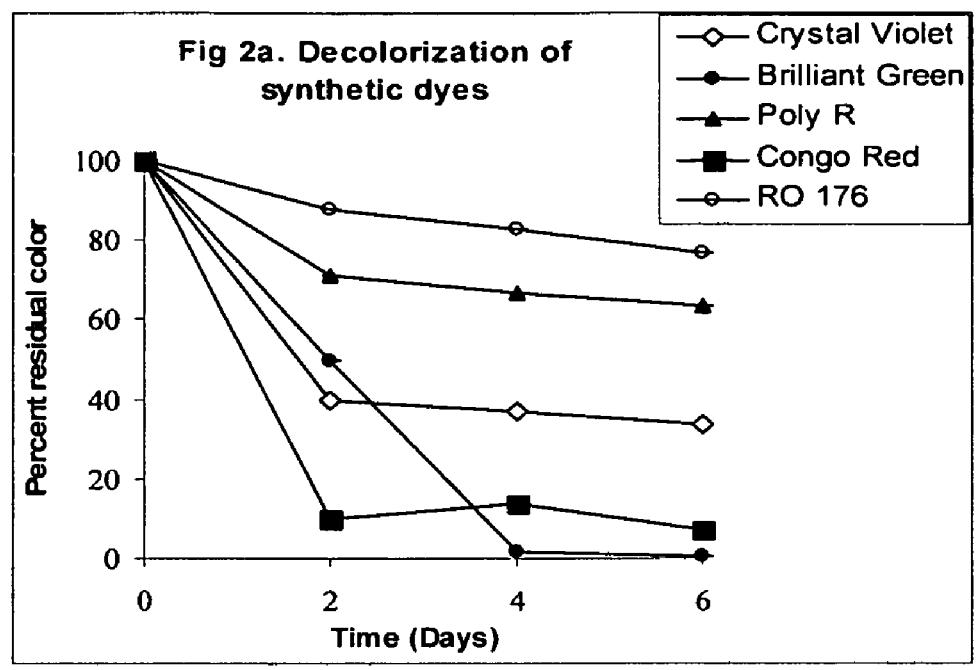
Fig 2a Decolorization of synthetic dyes
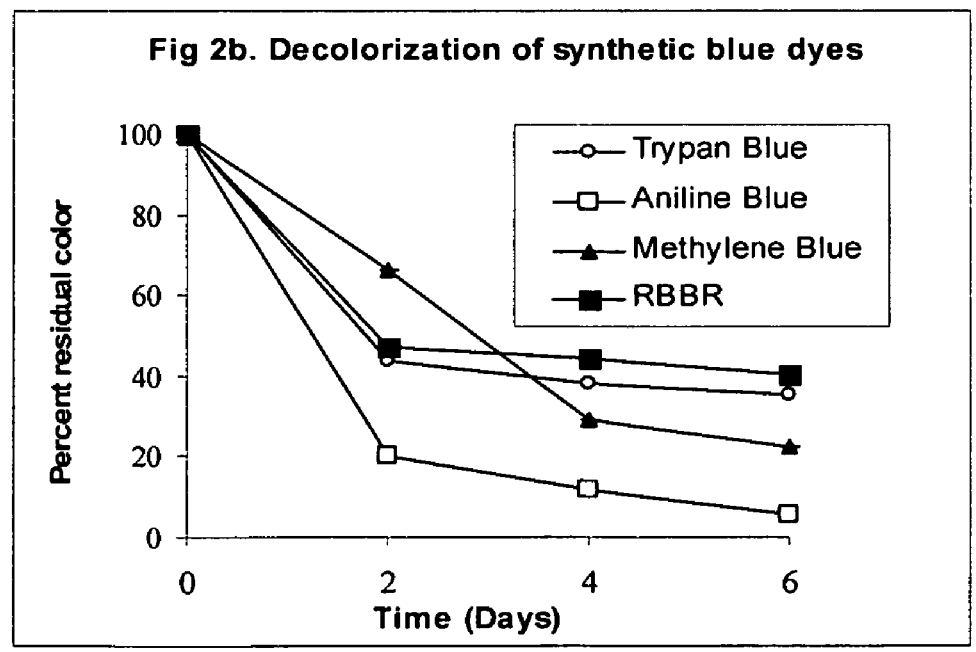
Fig 2b Decolorization of synthetic blue dyes

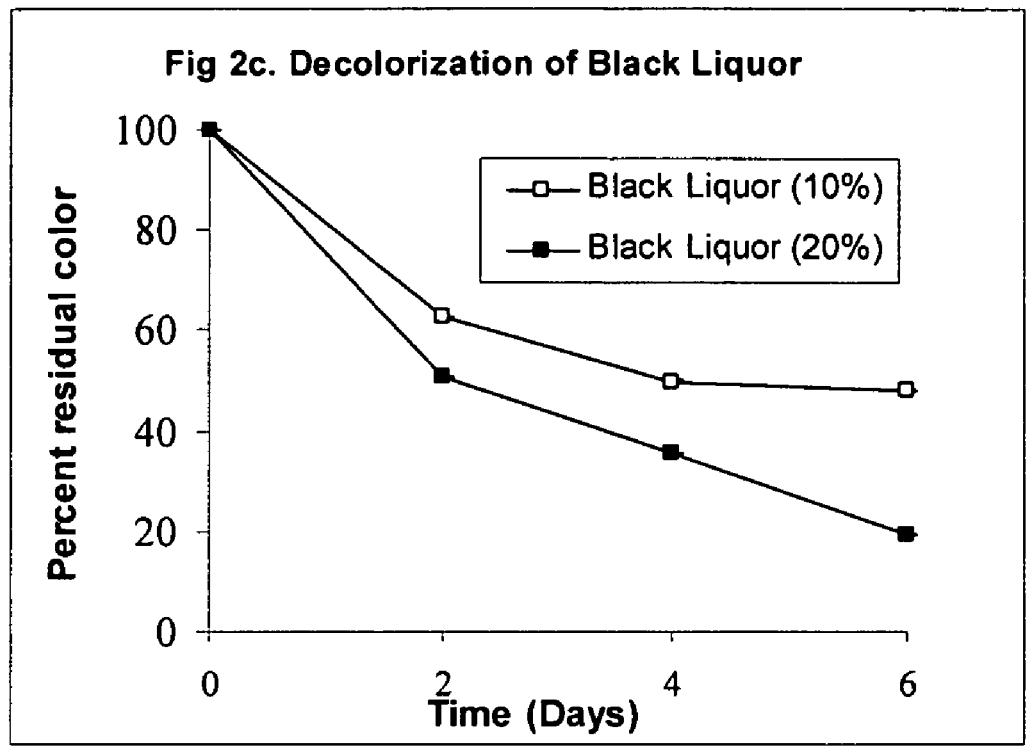
Fig 2c Decolorization of Black Liquor
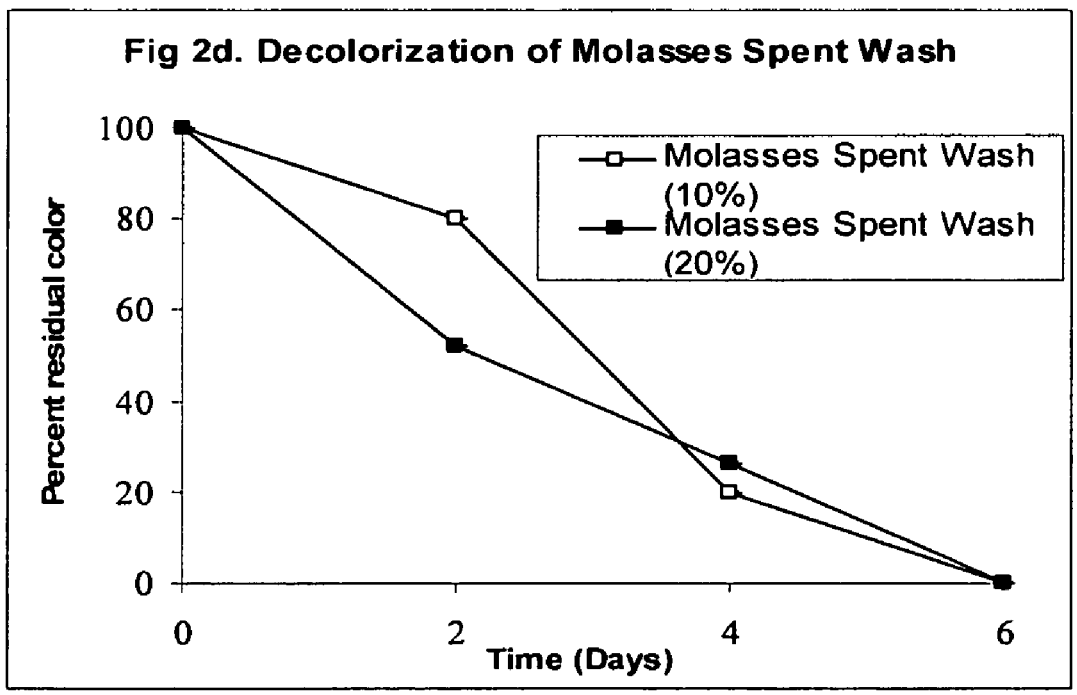
Fig 2d. Decolorization of Molasses Spent Wash

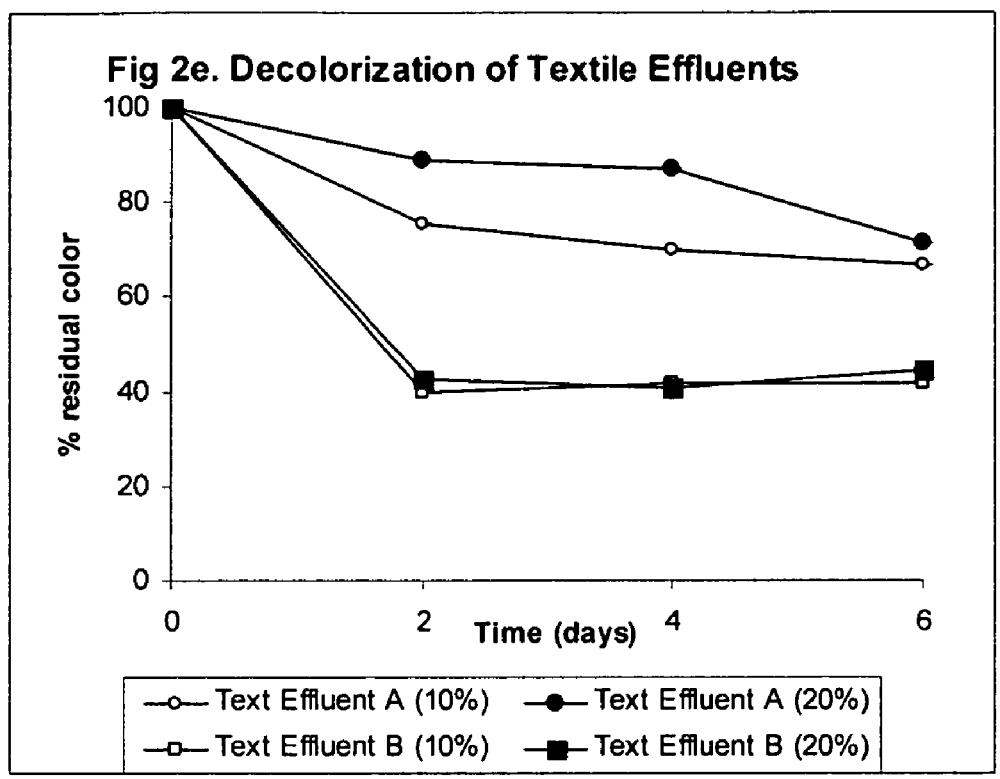
Fig 2e. Decolorization of Textile Effluents
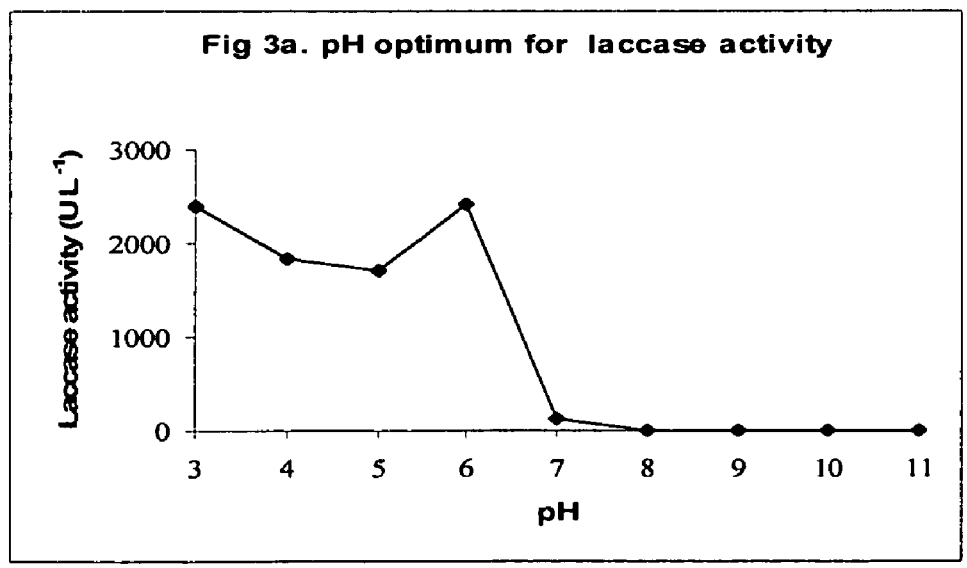
Fig 3a. pH optimum for laccase activity

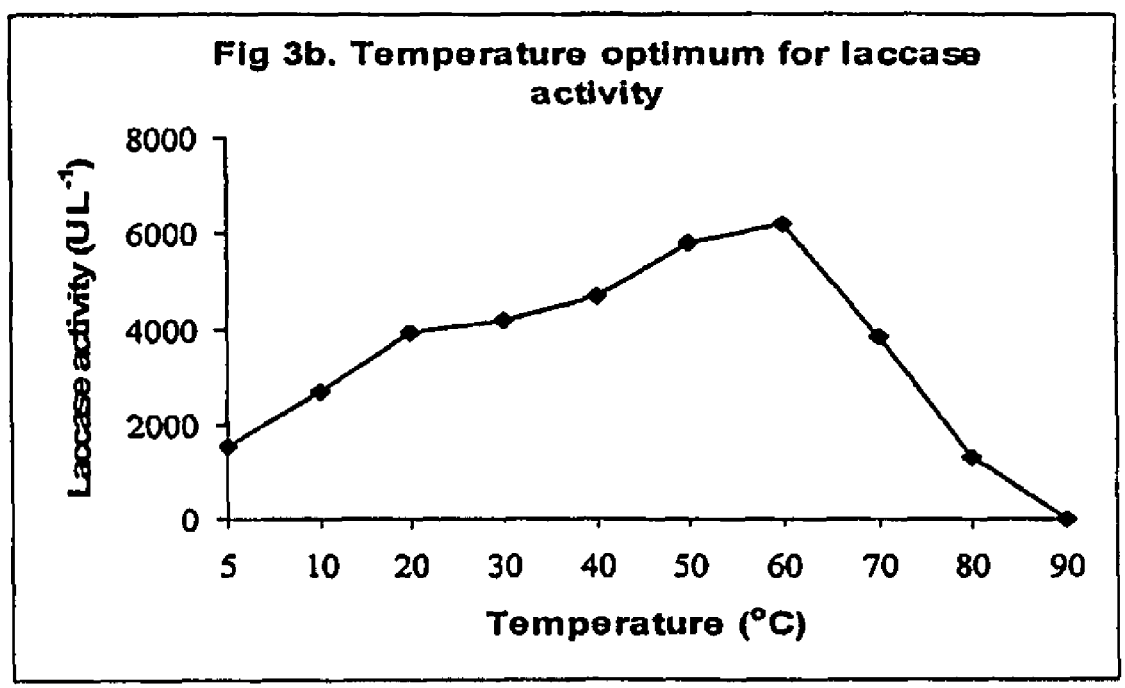
Fig 3b. Temperature optimum for laccase activity

PROCESSES FOR DECOLORIZATION OF COLORED EFFLUENTS

CROSS REFERENCE TO RELATED APPLICATIONS

This application is a national phase application filed under 35 U.S.C. §371 of PCT Application Number PCT/1N2005/000396, filed Dec. 2, 2005, which claims priority from Indian Patent Application number 2420/DEL/2004, filed Dec. 12, 2004.

FIELD OF INVENTION

The present invention relates to a novel process for decolorization of colored effluents. More particularly it relates to a process for decolorization of colored effluents of textile mills, dye-making industries, paper and pulp industries and molasses spent wash from alcohol distilleries using an unidentified marine fungus NIOCC #2a isolated from mangrove wood and deposited in the microbial type culture collection (MTCC) of the Institute of Microbial Technology, Chandigarh, India, under the accession number MTCC 5159. Further, this invention relates to decolorization of these effluents using the fungus directly, its cell-free culture supernatant or immobilized fungus or extracellular polymeric substances produced by the fungus. Furthermore, the decolorization of effluents can be carried out from 30° C. to 60° C. and at pH 3 to 6. The decolorization of various colored effluents occurs in the presence of sea water with 25 parts per thousand salinity. Besides, several synthetic dyes are also decolorized under similar conditions of temperature and pH by using free mycelia or immobilized fungus or extracellular culture fluids or extracellular polymeric substances.

DESCRIPTION OF PRIOR ART

Some of the industries that discharge highly colored effluents are paper and pulp mills, textiles and dye-making industries, alcohol distilleries and leather industries. The paper and pulp industry is one of the major polluters, discharging various kinds of gaseous, liquid and solid wastes into the environment. Some of these pollutants are naturally occurring wood extractives such as tannins and lignins, others are xenobiotic compounds that are formed during the paper making process such as chlorinated lignins and its degradation products and dioxins (Ali and Sreekrishnan, 2001, Aquatic toxicity from pulp and paper mill effluents: a review. Advances in Environmental Research 5: 175-196). In the production of high-grade paper, residual lignin is chemically liberated from wood pulp through the use of chlorine bleaching. As a result, large volumes of intensely coloured black liquors (BPEs) containing toxic chlorinated lignin degradation products, including chlorolignins, chlorophenols, chloroguiacols and chloroaliphatics are released into the environment (Reddy C. A. 1995. The potential for white-rot fungi in the treatment of pollutants. Current Opinion in Biotechnology 6:320-328). The primary contributor among these is the pulp black liquor which is intensely dark coloured, toxic and contain high molecular weight modified and chlorinated lignins. Chlorinated organic compounds are acute or chronically toxic besides being mutagenic and carcinogenic.

Industrial dyes are released into the environment by dye-making and textiles industries. About 10 to 15%0 of the total dye finds its way into the waste waters (see Rodriguez et al., 1999. Industrial dye decolorization by laccases from ligninolytic fungi. Current Microbiology 38:27-32). Several of these dyes are stable to microbial attack and are thus recalcitrant. These can be transformed to carcinogenic compounds under anaerobic conditions (Chung and Stevens, 1992. The reduction of azo dyes by the intestinal microflora. Critical Review in Microbiology 18: 175-190). Azo dyes are structurally by far the most diverse. These fast coloured dyes are a major source of concern to environmentalists since such pollutants, besides causing aesthetic damage to sites are also toxic and carcinogenic (Meyer, 1981. Biodegradation of synthetic organic colourants. Federation of European Microbiological Society Symposium 12:371-385). India, the former USSR, Eastern Europe, China, South Korea and Taiwan consume approximately 600 thousand tons (kt) of dyes per annum (Ishikawa et al., 2000 Chemical economics handbook: dyes. Mento Park (CA): SRI Chemical and Health business Services). Asia is the largest dyestuff market today, contributing to about 42% of usage of the global market.

Distilleries producing beverage alcohol by fermentation use sugarcane molasses as the raw material. The effluents from such distilleries contain large amounts of dark brown pigments called molasses or melanoidin pigments (Wedzicha and Kaputo, 1992 Melanoidins from glucose and glycine: composition, characteristics and reactivity towards sulphite ion. Food Chemistry 43: 359-367). Melanoidin pigments (MP) are the products of the "Maillard reaction" between sugars and amino compound produced on heating (Fitzgibbon et al., 1995. Biological treatment of distillery waste for pollution-remediation. Journal of Basic Microbiology 35: 293-301.). Pollution of aquatic ecosystems by molasses spent wash (MSW) is due to its intense brown colour which cuts off light, prevents photosynthesis and causes anaerobic conditions. When MSW is dispersed in soil, it acidifies the soil and thereby affects agricultural crops (Agarwal and Pandey, 1994. Soil pollution by spent wash discharge: depletion of manganese(II) and impairment of its oxidation. Journal of Environmental Biology 15: 49-53).

Besides colour, the various effluents from the above mentioned industries also contain various inorganic chemicals such as sulfides, sulfates, chlorides, carbonates, sodium hydroxide, peroxides and chlorine bleach compounds. The pH varies between 7 to 12. These chemicals may also add taste and odors (Bartlett, 1971. Public health Engineering-Design in metric waste water treatment. Applied Science Publishers, London).

Several physical and chemical processes for removal of colour from paper and pulp mills have been studied. These include rapid filtration through soil, ultrafiltration, ion-exchange chromatography, lime precipitation and modified bleaching sequences such as peroxide addition during extraction, the replacement of chlorine by hypochlorite, sorption on hypo and alum-sludge, activated carbon and so on (Ali and Sreekrishanan, 2001). As most of these processes are cost prohibitive, they are not commercially viable (Prasad and Joyce, 1993. Sequential treatment of EI stage Kraft bleach plant effluent. Bioresources and Technology 44: 141-147).

After the conventional primary and secondary treatments, the coloured effluents have reduced Biological oxygen demand (BOD) and chemical oxygen demand (COD) but colour removal is negligent and this is either achieved by diluting it with water or releasing it into soil without further treatment. A large quantity of water, which is a precious commodity in certain parts of the world, is therefore wasted in treatment. Bureau of Industrial Costs and Prices have shown that Indian mills use 250-300 $m^3$ of water to produce one ton of paper. Treatment normally consists of neutralization of excessive alkalinity together with an initial balancing and mixing of various liquors, followed by sedimentation with chemical coagulation and biological treatment. Anaerobic treatment is often used for dechlorinating chlorinated organic compounds, while concurrently removing BOD to produce methane gas. The effluent from an anaerobic process is discharged to the aerobic secondary treatment system for further quality improvement (Bartlett, 1971).

Several bacterial and microalgal cultures are reported as candidate organisms for bioremediation of various coloured pollutants (Bajpai and Bajpai, 1994 Biological color removal of pulp and paper millwaste waters. Journal of Biotechnology 33: 211-220; Dilek et al., 1999. Colour and AOX removal from pulping effluents by algae. Applied and Environmental Microbiology 52: 585-591). These are used as inocula in bioreactors either as free cells or immobilized onto suitable substrates at various stages of effluent treatment. Biodegradation of the target compounds is also been tried in continuous flow reactors where the organism is immobilized on to membranes. In an another approach, indigenous microorganisms are used to biodegrade toxic compounds in contaminated sites. This is achieved by adding nutrients and oxygenating or aerating the contaminated sites to enhance the in situ bioremediation process (Pugh et al., 1996 Bioremediation of contaminated soil and groundwater at a former solvent storage site. In: Biotechnology in Industrial Waste Treatment and Bioremediation. (eds. Hickey RF and Smith G). CRC Press Inc.:195-212).

The most efficient micro organisms to break down colored pollutants so far reported are white-rot fungi. These comprise mostly basidiomycetous fungi capable of extensive aerobic lignin degradation and mineralization. This is possible through several extra cellular lignin-degrading enzymes synthesized by these fungi. These enzymes lack substrate specificity and are thus capable of degrading a wide range of xenobiotics. Thus this invention relates to degradation of several such xenobiotic compounds in colored effluents by the unidentified white-rot fungus NIOCC #2a deposited at the Institute of Microbial Technology, Chandigarh, India and having the accession No MTCC 5159 can be made available to public after observing normal established procedures.

Normally, the colored pollutants are disposed after physical and chemical waste-minimization and biological treatments. Biological treatment includes biological pre-treatment with activated sludge of spent wash and treatment in stabilization ponds. Unfortunately, waste-water treatment facilities are often unable to completely remove the colored pigments from waste-waters and thus contribute to pollution of soil and aquatic habitats. Most of these colored pollutants are proven to be toxic to aquatic animals.

A. Various Organisms have been Tried for Decolorization of Black Liquor from Paper and Pulp Mills.

A.1. A reference may be made to a publication wherein a white-rot fungus *Phanerochaete chrysosporium* removed as much as 98% of the color from bleach plant effluent (BPE) within 10 days (Michel et al, 1991. Role of manganese peroxidases (MNP) and lignin peroxidases (LIP) of *Phanerochaete chrysosporium* in the decorization of kraft bleach plant effluent. Applied and Environmental Microbiology 57:2368-2375). However, the bleach plant effluent was decolorized only on contact with the live fungal biomass.

A.2. A reference may be made to a publication wherein another white-rot fungus *Tintoporia borbonica* removed 99% of the color of BPE in 4 days (Fukuzumi et al, 1977. Decororization of kraft waste liquor with white-rot fungi. Screening of fungi and culturing conditionsvfor decolorization of kraft waste liquor. Mokuzai Gakkaishi 23: 290-298). However, no mention is made whether kraft waste liquor was decolorized in the absence of the fungal biomass.

A.3. A reference may be made to a publication wherein the white-rot fungus *Schizophyllum commune* removed 90% of the color during 2 days of incubation (Belsare and Prasad, 1988. Decolorization of effluent from the bagasses-based pulp mills by white-rot fungus, *Schizophyllum commune*. Applied Microbiology and Biotechnology 28:301-304). Decolorization was achieved only when carbon and nitrogen sources were made available simultaneously in the medium where the fungus was actively growing.

A.4. A reference may be made to a publication wherein a shake culture of *Trametes versicolor* was reported to remove up to 93% color from BPE in 2 days (Bajpai et al, 1993. Decolorization of Kraft bleach plant effluent with the white-rot fungus *Trametes versicolor*. Process in Biochemistry 28: 377-384.). Decolorization by culture supernatant from the said fungus has not been reported in this case.

A.5. A reference may be made to a publication wherein a marine-related fungus *Flavodon flavus* removed about 75% of the color from BPE within 4 days and about 100% within 10 days (Raghukumar et al. 1996. Degradation of lignin and decolorization of paper mill bleach plant effluent (BPE) by marine fungi. Biotechnology Letters 18: 105-108). However, no decolorization of BPE was achieved using the culture supernatant.

A.6. A reference may be made to publications wherein fungi other than white-rot fungi have been reported to decolorize BPE. Thus *Aspergillus niger* removed 80% of the color from BPE after 2 days (Kannan, 1990. Delorization of pulp and paper mill effluent by growth of *Aspergillus niger*. World Journal of Microbiology and Biotechnology 62:114-116.) and *Trichoderma* sp has been reported to remove about 85% of the color in BPE (Prasad and Joyce, 1991. Color removal from kraft bleach plant effluents by *Trichoderma* sp. TAPPI Journal 74: 165-169). Decolorization using culture supernatant of exopolymeric substance by these fungi has not been illustrated.

B. Various Organisms have been Tried for Decolorization of Effluent from Textile and Dye-Making Industries and Various Synthetic Dyes.

B.1. Reference may be made to a US patent wherein, living, dead, free, immobilized white-rot fungi *Myrothecium* and *Ganoderma* sp. have been employed for adsorption, dye degradation and color removal (U.S. Pat. No. 5,091,089, "decolorization of dye-containing waste-water", 25, Feb. 1992). However, no reference has been made regarding decolorization of dyes using culture supernatants or exopolymeric substances.

B.2. A reference may be made to a US patent wherein white-rot fungus *Phanerochaete chrysosporium* and actinomycetes *Streptomyces* sp are used in degradation of xenobiotic azo dyes (U.S. Pat. No. 6,755,14, titled "Increasing biodegradability of xenobiotic azo dyes". 24, Mar. 1992). However, decolorization in the presence of sea water conditions and higher temperature have not been reported in this patent.

B.3. A reference may be made to a German patent (DD-290004, titled" Microbial breakdown of xenobiotic dyes of triphenylmethane series, 16, May 1991) wherein, degradation of crystal violet and malachite green are brought about by oleophilic gram-positive bacteria preferably *Corynebacterium* sp. IMET 11347 or *Mycobacterium* sp. IMET 11349. The disadvantage of this system is that the organisms have to be grown at 32° C. in 1% methanol and removal of bacterial inoculum from dye-containing waste-water is not very easy.

B.4. A reference may be made to a (U.S. Pat. No. 6,395, 534, titled "White-rot-lignin-modifying fungus *Flavodon flavus* and a process for removing dye from dye-containing water or soil using the fungus") wherein the said fungus when grown in the culture media prepared with sea water or distilled water decolorizes several synthetic dyes. However, the presence of fungus was required for decolorization of these dyes as the cell-free culture supernatant could not perform the same function.

B.5. A reference may be made to a patent (WO 03035561, titled "Sustainable process for the treatment and detoxification of liquid waste") wherein several white-rot fungi have been reported to decolorize waste-waters containing dyes and effluent from paper and pulp mills. However, these fungi have not been reported to decolorize molasses spent wash.

B.6. A reference may be made to a publication (Fu and Viraraghavan, 2001, Fungal decolorization of dye wastewaters: a review. Bioresource Technology 79:251-262) wherein the fungal biomass as biosorbents are shown to be an obvious choice for treatment of dye wastewaters. However, biosorption is only a pollution transfer since the xenobiotics are not destroyed but are only concentrated.

C. Various Organisms have been Tried for Decolorization of Effluent Called Molasses Spent Wash from Alcohol Distilleries Containing Melanoidin Pigments.

C.1. A reference may be made to a publication wherein filamentous fungi of the order Mycelia Sterilia were screened for decolorization of molasses pigments (Sirianuntapiboon, S; Somchai; P; Ohmomo, S, and P. Atthasampunna. 1988. Screening of filamentous fungi having the ability to decolorize molasses pigments. Agriculture Biological Chemistry, 52:387-392). The maximum decolorization was achieved within 7-8 day culture.

C.2. A reference may be made to a publication wherein a thermophilic strain of *Aspergillus fumigatus* G-2-6 was shown to decolorize molasses melanoidin to an extent of 75% at 45° within 3 days with shaking (Ohmomo, S; Kaneko, Y; Sirianuntapiboon, S.; Somchai, P; Atthasampunna, P and I. Nakamura. 1987. Decolorization of molasses waste-waters by a thermophilic strain, *Aspergillus fumigatus* G-2-6. Agriculture Biological Chemistry, 51:3339-3346). Culture-free supernatant has not been reported to decolorize the melanoidins by this fungus.

C.3. A reference may be made to a publication wherein *Artemia* larvae have been used for treatment of distillery waste and have shown to decrease B.O.D and C.O.D levels considerably. However, they do not help in decolorizing the molasses spent wash (Rahaman, A. A., Ambika Devi, Sosamma M. E. and Prabhakar, J. 1992. Distillery effluent treatment using *Artemia*. Journal of Experimental Biology, 30: 313-316).

C.4. A reference may be made to a publication wherein the melonoidins prepared from a glucose-glycine system are decolorized and degraded on ozone treatment. (Kim, S. B. and Park Y. H. 1986. Decolorization and degradation products of melonoidin by active oxygen. Bulletin of Korean Fisheries Society, 19:36-44. However, this process is expensive and not practical.

C.5. A reference may be made to a (U.S. Pat. No. 6,613, 559, titled "simultaneous decolorization and detoxification of molasses spent wash using novel white-rot-lignin-modifying fungus *Flavodon flavus*", 2, Sep. 2003) wherein the fungus removed about 80% of the color from MSW within 9 days. However, the culture needs to be oxygenated with 100% oxygen for optimal performance by the fungus.

Comparison of NIOCC 2a with Other Cultures Used for Decolorization of Dyes

| ORGANISM | DYE | REFERENCE | DISADVANTAGES |
|---|---|---|---|
| *Myrothecium* and *Ganoderma* sp | Dye-containing waste-water | U.S. Pat. No. 5,091,089, "decolorization of dye-containing waste-water", 25.02.92 | However, no reference has been made regarding decolorization of dyes using culture supernatants or exopolymeric. substances |
| *Phanerochaete chrysosporium* & actinomycetes *Streptomyces* sp | Xenobiotic azo dyes | U.S. Pat. No. 6,755,14, titled "Increasing biodegradability of xenobiotic azo dyes". 24.03.92 | However, decolorization in the presence of sea water conditions and higher temperature have not been reported in this patent. |
| *Corynebacterium* sp. IMET 11347 or *Mycobacterium* sp. IMET 11349 | Crystal violet and malachite green | German patent (DD-290004, titled" Microbial breakdown of xenobiotic dyes of triphenylmethane series, 16.05.91) | The disadvantage of this system is that the organisms have to be grown at 32° C. in 1% methanol and removal of bacterial inoculum from dye-containing waste-water is not very easy. |
| *Flavodon flavus* | Several synthetic dyes. | U.S. Pat. No. (6,395,534, titled "White-rot-lignin-modifying fungus *Flavadon flavus* and a process for removing dye from dye-containing water or soil using the fungus") | However, the presence of fungus was required for decolorization of these dyes as the cell-free culture supernatant could not perform the same function |
| White-rot fungi | Waste-waters containing dyes and effluent from paper and pulp mills | A patent (WO 03035561, titled "Sustainable process for the treatment and detoxification of liquid waste") | However, these fungi have not been reported to decolorize molasses spent wash. |
| Fungal biomass | Dye waste waters | Fu and Viraraghavan, 2001 | However, biosorption is only a pollution transfer since the xenobiotics are not destroyed but are only concentrated. |

Comparison of NIOCC 2a with Other Cultures Used for Decolorization of Molasses Spent Wash

| ORGANISM | EFFLUENT | TIME REQD | PERCENT REMOVAL | REFERENCE | DISADVANTAGES |
|---|---|---|---|---|---|
| Filamentous fungi of the order *Mycelia Sterilia* | Molasses pigments | 7-8 days | | Sirianuntapiboon et al, 1988 | However Culture-free supernatant has not been reported to decolorize the melanoidins by this fungus. |
| *Aspergillus fumigatus* G-2-6 | Molasses melanoidin | 3 days with shaking | 75%/45° C. | Ohmomo, S et al 1987. | Culture-free supernatant has not been reported to decolorize the melanoidins by this fungus. |
| *Artemia larvae* | Distillery waste | | | Rahaman, A et al 1992 | However, they do not help in decolorizing the molasses spent wash. |
| Ozone treatment | Melonoidins prepared from a glucose-glycine system | | | Kim et al 1986. | However, this process is expensive and not practical. |
| *Flavadon flavus* | Molasses Spent Wash | 9 days. | 80% | U.S. Pat. No. (6,613,559, titled "simultaneous decolorization and detoxification of molasses spent wash using novel white-rot-lignin-modifying fungus *Flavodon flavus*", Feb. 09, 2003) | However, the culture needs to be oxygenated with 100% oxygen for optimal performance by the fungus. |

Comparison of NIOCC 2a with Other Cultures Used for Decolorization of Bleach Plant Effluent

| ORGANISM | EFFLUENT | TIME REQD | PERCENT REMOVAL | REFERENCE | DISADVANTAGES |
|---|---|---|---|---|---|
| *Phanerochaete chrysosporium* | Bleach plant effluent (BPE) | 10 days | 98% | Michel et al, 1991 | However, the bleach plant effluent was decolorized only on contact with the live fungal biomass. |
| *Tintoporia borbonica* | Bleach plant effluent | 4 days | 99% | Fukuzumi et al, 1977 | However, no mention is made whether kraft waste liquor was decolorized in the absence of the fungal biomass. |
| *Schizophyllum commune* | Bagasse-based pulp mill effluent | 2 days | 90% | Belsare and Prasad, 1988 | Decolorization was achieved only when carbon and nitrogen sources were made available simultaneously in the medium where the fungus was actively growing. |
| *Trametes versicolor* | Bleach plant effluent | 2 days | 93% | Bajpai et al, 1993 | Decolorization by culture supernatant from the said fungus has not been reported in this case. |

-continued

| ORGANISM | EFFLUENT | TIME REQD | PERCENT REMOVAL | REFERENCE | DISADVANTAGES |
|---|---|---|---|---|---|
| *Flavodon flavus* | Paper bleach plant effluent | 4 days-10 days | 75%-100% | Raghukumar et al. 1996 | However, no decolorization of BPE was achieved using the culture supernatant. |
| *Aspergillus niger* | Bleach plant effluent | 2 days | 80% | Kannan, 1990 | Decolorization using culture supernatant of exopolymeric substance has not been illustrated. |
| *Trichoderma sp* | Bleach plant effluent | | 85% | Prasad and Joyce, 1991 | Decolorization using culture supenatant of exopolymeric substance by these fungi has not been illustrated. |

Thus, keeping in purview all what has been stated above and reported in the literature the inventors realized that there exists a need to develop a single process for the decolorization of a variety of colored effluents ranging from black liquor generate from Pulp & Paper industries, molasses spent wash from distilleries, textile dye waste-waters and synthetic dyes.

OBJECTS OF THE INVENTION

The main objective of the present invention is to provide a novel process for decolorization of the brown pigments in black liquor, molasses spent wash and colored dye waters using the unidentified filamentous fungus NIOCC 2a for possible use in treatment of effluent from paper and pulp industries, alcohol distilleries, textile and dye-making industries and saline conditions which obviates drawbacks as detailed above. The said fungus can be efficiently utilized for the above mentioned usage under fresh water as well as estuarine conditions because of its tolerance to sea salts.

Another objective of the present invention is to provide a process for scaling up laccase production using inexpensive additives. The biomass of the fungus produced this way or the extracellular culture fluid or the extracellular polymeric substance (EPS) produced in the culture can be used for decolorization of black liquor, molasses spent wash, effluent from textile dye industries and synthetic dyes within 6-12 hours of incubation. The biomass of the fungus can also be immobilized on polyurethane foam cubes or sheets using conventional techniques used for immobilizing fungi and used for bioremediation of colored effluents.

SUMMARY OF INVENTION

Accordingly, the present invention provides a novel process for the decolorization of colored effluents, which comprises:
a) culturing the yet unidentified, filamentous, non-sporulating fungus MTCC 5159 having the characteristics such as herein described in a conventional nutrient medium optionally prepared with sea water with salinity ranging from 25 to 35 parts per thousand optionally containing assimilable C and N source for a period of 6 to 12 days to obtain a fungal biomass;
b) separating the fungal biomass from the culture medium of step [a] to obtain cell-free supernatant;
c) freezing the cell-free supernatant obtained in step [b] for 12 to 24 hours followed by thawing thereof to obtain a precipitate containing the exoploymeric substance [EPS] and a supernatant;
d) precipitating the remaining EPS from the supernatant obtained in step [c] with methanol;
e) pooling and centrifuging the precipitates obtained in step [c] and [d] to obtain exoploymeric substance;
f) contacting the colored effluents optionally in a diluted form either with the fungal biomass obtained in step [a] or cell-free supernatant obtained in step [b] or the exoploymeric substance as obtained in step [f] for a period ranging from 6 hours to 6 days at temperature ranging from 30 to 60 degree C. and pH ranging from 3 to 6 to get decolorized water.

In an embodiment of the present invention, the carbon source for growing the fungus used is selected from glucose, fructose, sorbitol and starch, at 1% concentration.

In another embodiment of the present invention, the nitrogen source used for growing the fungus can preferably be peptone or ammonium tartarate with the concentration of the nitrogen source for growing the fungus ranging from 0.02 to 0.2%.

In yet another embodiment of the present invention, the medium for growing the fungus is preferably prepared with seawater having 25 parts per thousand salinity.

In still another embodiment of the present invention, the medium is optionally supplemented with 1% diluted textile mill effluent or copper sulphate at 2 mM concentration.

In an embodiment of the present invention, the age of the said fungal inoculum used is at least 6 days to get maximum decolorization of the effluents namely black liquor, molasses spent wash and textile dye wastewater.

In a further embodiment of the present invention, the fungal biomass can be immobilized on cubes or sheets of polyurethane foam or any other suitable matrix.

In still another embodiment of the present invention, the efficacy of the culture supernatant for decolorization may be increased by growing the culture in media containing inducers which may be dyes, phenolic compounds and effluents.

In an embodiment of the present invention, the exopolymeric substance (EPS) produced by the fungus at a minimum concentration of 1% (by weight) can be incubated with the above mentioned effluents for a minimum period of 6 hours to get decolorized effluents.

In yet another embodiment of the present invention, the colored effluents are preferably selected from the group consisting of black liquor from paper and pulp industries, molasses spent wash from distilleries, textile dye waste-waters and synthetic dyes.

In still another embodiment of the present invention, the dilution of the colored effluents is done in the range of 10 to 20%.

In an another embodiment of the present invention, the contacting of the colored effluents with fungal biomass is carried out for a period of preferably 2 to 6 days at a temperature preferably 30 degree C. and pH preferably 6.0.

In a further embodiment of the present invention, the contacting of the colored effluents with the cell-free supernatant is carried out for a period of preferably 12 hours at a temperature preferably 60 degree C. and pH preferably 6.0.

In still another embodiment of the present invention, the contacting of the colored effluents with the exopolymeric substance is carried out for a period of preferably 24 hours at a temperature preferably 60 degree C. and pH preferably 6.0.

In yet another embodiment of the present invention, the separation of the fungal biomass from the culture medium is carried out preferably by vacuum filtration or centrifugation.

DETAILED DESCRIPTION OF THE INVENTION

The organism used in the present invention is an unidentified non sporulating filamentous fungus isolated from mangrove wood, from a coastal marine environment. The said fungus was isolated from decaying mangrove wood incubated in moist chamber.

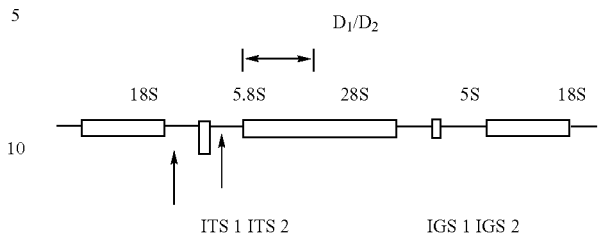

Schematic Representation of the Fungal rRNA Gene; ITS (Internal Transcribed Spacer), IGS (Intergenic Spacer) and $D_1/D_2$ (Domains 1 & 2)

Final Submitted Sequence Using ITS1 & ITS4 (Forward & Reverse) Primer (Shows Degeneracy at 3 Positions Out of the 500 Nucleotides Sequenced)

```
5'GGCCCCAACCGGGCATGTGCACATTCTGTTCATTCCATTCTCATACACCTCTGTG
CACTTTACATAGGTTTGGTATAGAAAAGGTCTTTATTGACTTTGGAAATACTGACCT
ATGCTTTTACAAACGCTTCAGTTTTAGAATGTCATCCGCGTATAACGCAA■AAATAC
AACTTTCAGCAACGGATCTCTTGGCTCTCGCATCGATGAAGAACGCAGCGAAATGC
GATAAGTAATGTGAATTGCAGAATTCAGTGAATCATC■AATCTTTGAACGCATCTTG
CGCCCTTTGGTATTCCGAA■GGCATGCCTGTTTGAGTGTCATGGTATTCTCAATAC
CCCAAATCTTTGCGGATAAGGGTGTGTTGGACTTGGAGGTTTTTGCAGGTAATGAT
TGTATTACCAGCTCCTCTTAAATGCATTAGCAGAGATAATACTGCTACTCTCCAGTG
TGATAATTGTCTACACTGTTAGTAGTGCGGTATAACAAAATGTCTATGC 3'

Key: S=C/G
     R=A/G
     D=T/G
``` fungus can be grown in a modified Boyd & Kohlmeyer (B&K) medium containing 1% glucose, 0.2% peptone, 0.1% yeast extract and 1.8% agar dissolved in 25 ppt sea water. The fungal mat grown this way may be macerated and used as starter inoculum for the experimental cultures in B&K medium prepared in 25 ppt sea water. The conventional media can be natural or synthetic media containing carbon, nitrogen sources and inducers to increase the production of extra cellular lignin degrading enzymes in the culture medium. The said fungus can also be immobilized in polyethylene foam or any other suitable material and used for colour removal from various colored effluents. The said fungus MTCC 5159 produces lignin-modifying enzyme laccase bearing the International Enzyme Commission number E.C. 1.10.3.2 when grown in conventional media prepared with sea water. By virtue of the lignin-modifying enzyme laccase which break down a broad range of xenobiotics, this fungus is useful in degradation of a wide range of heterocyclic azo and polymeric dyes besides other industrial colored pollutants.

The final and conclusive identification of a fungus up to species level is based on the characteristics exhibited by the fungus in its sexual stage (sporulation stage). The fungus NIOCC 2a is a fungus whose sporulating stage has not yet been identified even though it has been grown in special media meant to induce sporulation. It has been identified up to class level using molecular taxonomy techniques. Here a portion of the ribosomal DNA (rDNA) of NIOCC 2a i.e the Internally transcribed spacer region (ITS) 2 and 5.8 rDNA has been sequenced and aligned with the rDNA of other known fungi whose sequences are submitted at the gene bank database.

Upon blasting with gene bank (NCBI), the sequence of NIOCC #2a (MTCC 5159) was found to closely resemble a basidiomycetous fungus. However, it is yet to be identified. The sequence was allotted the accession number AY939879.

From the above results NIOCC 2a is considered to be a basidiomycete, this is supported by white fluffy mycelial growth which is characteristic of white rot or basidiomycetous fungi.

FIG. 1a represents growth of the fungus NIOCC 2a in Boyd and Kohlmeyer's medium containing natural carbon and nitrogen source and prepared with sea water of various salinities. FIG. 1b represents production of laccase enzyme by this fungus at various salinities.

FIGS. 2a and 2b represent decolorization several synthetic dyes by the fungus. FIG. 2c represents decolorization of black liquor used at 10 and 20% concentrations. 10 ml of beach plant effluent with 90 ml of the culture medium (this gives 10% final concentration), similarly 20 ml of beach plant effluent with 80 ml of the culture medium (this gives 20% final concentration) prepared in seawater of 25 parts per thousand salinity was used for this experiment. The values represent percentage residual color in the medium on respective days. FIG. 2d represents decolorization of molasses spent wash used at 10 and 20% concentrations by NIOCC 2a. FIG. 2e represents decolorization of textile mill effluents collected at various stages namely A and B used at 10 and 20% concentrations.

FIG. 3a, 3b represent activity of laccase at different pH and temperatures respectively.

Black liquor is dark brown in color and after decolorization by the fungus MTCC 5159, it turns light brown after 6 days. Similarly molasses spent wash is dark brown and turns straw color after 6 days. Textile effluents A, originally magenta in color was comparatively difficult to decolorize whereas Textile effluent B, originally bottle green in color was comparatively easy to decolorize to a light green color after 6 days. The process for the decolorization of various effluents utilizing the fungal biomass involves addition of sterilized, appropriately diluted effluents to a 6 day-old culture of NIOCC 2a growing in B&K medium. The degradation of effluents and various dyes is monitored spectrophotometrically by removing an aliquot of sample from these cultures and measuring changes in absorbance at appropriate wavelengths. The decolorization is measured every alternate day up to 6 days. Heat-killed cultures serve as controls where none to very low decolorization takes place due to adsorption.

The process of decolorization of various dyes and effluents using the cell-free supernatant involves addition of filter sterilized culture supernatant of the said fungus grown in the presence of various dyes, inducers and dilute effluents. The decolorization of the effluents was monitored spectrophotometrically at appropriate wavelengths up to 12 hours. The uninoculated culture medium containing these dyes served as control.

The process of decolorization of effluents using the exoploymeric substance (EPS) produced by the fungus is carried out using separated and freeze dried EPS. A known amount of EPS is incubated with appropriately diluted effluents for a period of 6 to 12 hours. The decolorization is monitored in the supernatant after centrifugation. While using the EPS, about 10 mg of EPS (dry weight) is contacted with 3 ml of effluent having the final concentration of 10%.

The induction of the lignin modifying enzyme, laccase in the culture supernatant of the said fungus can be done by the addition of various inducers in the form of dyes, phenolic compounds and diluted effluents. The range of inducers added were from 0.01 to 0.05% at the final concentration (This is calculated from the mM concentrations added to the fungal cultures, as given in the example 2)

The said fungus MTCC 5159 is capable of growing and producing the lignin modifying enzyme laccase in the presence of seawater. The decolorization of various dyes and effluents also takes place in the presence of seawater. The effluents discharged generally have a temperature of 50° to 60° C. Most of the industrial effluents from textiles, dye stuff, paper and pulp industries and alcohol distilleries contain chromogenic substances as well as high concentrations of salts especially chlorides and sulphates (Barlett, 1971). In light of this, salt tolerant organisms with enzymes active at high temperatures are best suited for such wastewater treatments. Most of the fungi used for bioremediation of such colored wastewaters do not possess salt tolerance nor do they posses enzyme laccase acting at high temperature. In view of this the present process has an advantage over the conventional processes referred to in various patents and publications discussed above. Additionally we are reporting decolorization of BPE, MSW and textile dye wastewaters as well as synthetic dyes by the same fungus namely NIOCC 2a.

The lignin modifying enzyme laccase has a broad substrate specificity and thus able to oxidize several environmental pollutants. The laccase production by the said fungus is enhanced by various additives to the conventional natural medium prepared with seawater.

The following examples are given by way of illustration of the present invention and therefore should not be construed to limit the scope of the present invention.

Example 1

The growth of MTCC 5159 was determined in liquid medium containing 1% glucose, 0.2% peptone and 0.1% yeast extract (hereafter called B & K medium) dissolved in sea water varying in salinity from 0 to 34 ppt and pH of 7.0. The culture was harvested in triplicates on the days 3, 6, 9, 12 and 15, rinsed in distilled water and then filtered through dried, pre-weighed GF/C filter papers and dried to a constant weight. The difference In weight was expressed as mg dry weight. Accordingly FIG. 1a shows that the maximum biomass is produced in medium prepared in 34 ppt seawater on day 9. The laccase activity in the culture supernatant was measured using 2 mM ABTS prepared in 100 mM glycine-HCl buffer (pH 3) at 405 nm spectrophotometrically as a function of time. Accordingly FIG. 1b shows that the maximum laccase production in medium prepared with 25 ppt seawater on day 12.

Example 2

In order to enhance the laccase production by MTCC 5159 various inducers were added to a 3 day old culture grown in B&K medium prepared in 25 ppt sea water having a pH of 7.0. The inducers such as p-anisidine, catechol, guaiacol, ferulic acid, vanillic acid, veratryl alcohol and 2,5 dimethyl aniline were used at a final concentration of 1 mM. Copper sulphate at a concentration of 2 mM, indulin at 0.25% and a combination of 2 mM copper sulphate and 1 mM guaiacol were used. The laccase activity in the culture supernatant was measured at an interval of 3 days up to 21 days as described in Example 1.

Dyes which are generally used for decolorization were also tested for their laccase induction properties. Trypan blue, aniline blue and remazol brilliant blue R at a final concentration of 0.04%, methylene blue, crystal violet, brilliant green and congo red at 0.02% and reactive orange 176 at 0.015% final concentration were added to B & K medium prepared in 25 ppt sea water having the pH of 7.0. The effluents were also tested for their effect on enhancing the synthesis of laccase.

Effluents contain a variety of compounds, which include phenolics as well as dyes, hence the effluent not only act as a substrate for laccase but also enhance its production by acting as an inducer. Effluents like textile effluent A and textile effluent B as well as molasses spent wash (MSW) and black liquor were also screened for their laccase inducing properties, each at 1, 10 and 20 percentage concentrations. They were added to B & K medium prepared in 25 ppt sea water having the pH of 7.0. The laccase activity in the culture supernatant was measured using 2 mM ABTS prepared in 100 mM glycine-HCl buffer (pH 3) at 405 nm spectrophotometrically as a function of time.

TABLE 1a

INDUCERS FOR ENHANCEMENT OF LACCASE PRODUCTION BY NIOCC 2a
LACCASE ACTIVITY (UL$^{-1}$)

| INDUCER | DAYS | | | | | | |
|---|---|---|---|---|---|---|---|
| | 3 | 6 | 9 | 12 | 15 | 18 | 21 |
| B & K medium (control) | 0 | 0 | 404 | 166 | 158 | 921 | 838 |
| p-Anisidine (1 mM) | 73 | 92 | 32 | 35 | 24 | 1200 | 1351 |
| Catechol (1 mM) | 21 | 36 | 53 | 27 | 27 | 1246 | 1675 |
| Copper sulphate (2 mM) | 16 | 197 | 185 | 119 | 36571 | 42933 | 83619 |
| Guaiacol (1 mM) | 0 | 85 | 979 | 384 | 344 | 1258 | 21112 |
| Copper sulphate (2 mM) & Guaiacol (1 mM) | 36 | 485 | 14078 | 21347 | 44457 | 45257 | 46781 |
| Ferulic Acid (1 mM) | 9 | 70 | 7502 | 1407 | 1755 | 873 | 780 |
| Indulin (0.25%) | 0 | 63 | 79 | 66 | 62 | 894 | 1174 |
| Vanillic acid (1 mM) | 75 | 265 | 68 | 48 | 32 | 1599 | 1359 |
| Veratryl alcohol (1 mM) | 14 | 112 | 768 | 395 | 332 | 1889 | 1931 |
| 2,5 dimethyl aniline (1 mM) | 0 | 232 | 133 | 177 | 128 | 548 | 633 |

TABLE 1b

DYES AS INDUCERS FOR ENHANCEMENT OF LACCASE PRODUCTION
LACCASE ACTIVITY (UL$^{-1}$)

| INDUCER | DAYS | | | | | | | |
|---|---|---|---|---|---|---|---|---|
| | 3 | 6 | 8 | 10 | 12 | 14 | 16 | 18 |
| Trypan Blue (0.04%) | 21 | 1 | 149 | 747 | 844 | 897 | 812 | 505 |
| Aniline Blue (0.04%) | 12 | 67 | 21 | 825 | 1051 | 1166 | 1211 | 1048 |
| Methylene Blue (0.02%) | 0 | 51 | 93 | 634 | 783 | 651 | 656 | 666 |
| RBBR (0.04%) | 3 | 43 | 0 | 0 | 0 | 0 | 0 | 0 |
| Crystal Violet (0.02%) | 4 | 104 | 0 | 581 | 825 | 819 | 671 | 745 |
| Brilliant Green (0.02%) | 13 | 53 | 0 | 1852 | 1821 | 2271 | 2191 | 2156 |
| Poly R (0.02%) | 17 | 36 | 0 | 187 | 248 | 241 | 266 | 325 |
| Congo Red (0.02%) | 5 | 5 | 115 | 955 | 966 | 1363 | 1389 | 1241 |
| RO 176 (0.015%) | 21 | 8 | 335 | 949 | 904 | 1158 | 1108 | 1180 |

TABLE 1c

EFFLUENTS AS INDUCERS FOR ENHANCEMENT OF LACCASE PRODUCTION
LACCASE ACTIVITY (UL$^{-1}$)

| INDUCERS | DAYS | | | | | | |
|---|---|---|---|---|---|---|---|
| | 3 | 6 | 9 | 12 | 15 | 18 | 21 |
| Textile effluent A (1%) | 25 | 113 | 937 | 440 | 404 | 2036 | 1886 |
| Textile effluent B (1%) | 7 | 358 | 4545 | 85829 | 19086 | 42248 | 266 |
| MSW (1%) | 0 | 159 | 1566 | 563 | 505 | 1756 | 2075 |
| Black Liquor (1%) | 2 | 139 | 738 | 296 | 268 | 1299 | 1156 |

TABLE 1d

EFFLUENTS AS INDUCERS FOR ENHANCEMENT OF LACCASE PRODUCTION
LACCASE ACTIVITY (UL$^{-1}$)

| INDUCER | DAYS | | | | | | | |
|---|---|---|---|---|---|---|---|---|
| | 3 | 6 | 8 | 10 | 12 | 14 | 16 | 18 |
| Text Effluent A (10%) | 0 | 1 | 42 | 275 | 226 | 251 | 352 | 250 |
| Text Effluent A (20%) | 0 | 3 | 334 | 387 | 225 | 1400 | 426 | 354 |
| Text Effluent B (10%) | 21 | 29 | 588 | 1191 | 1061 | 1283 | 1478 | 763 |
| Text Effluent B (20%) | 0 | 8 | 931 | 968 | 738 | 592 | 1003 | 1087 |
| MSW (10%) | 0 | 46 | 100 | 187 | 105 | 117 | 157 | 188 |
| MSW (20%) | 0 | 22 | 94 | 176 | 115 | 198 | 186 | 230 |
| Black Liquor (10%) | 0 | 0 | 230 | 270 | 235 | 256 | 246 | 237 |
| Black Liquor (20%) | 6 | 44 | 68 | 85 | 89 | 128 | 173 | 110 |

Accordingly, Table 1a shows copper sulphate is the best inducer. Among the dyes, Table 1b shows that brilliant green induced maximum laccase production on day 14. Among the effluents, Table 1c shows that textile effluent B at 1% concentration induced maximum laccase production on day 12. When these effluents were used at 10 and 20% concentrations there was an inhibitory effect. However textile effluent B was still the best.

Example 3

The fungus MTCC 5159 was tested for its ability to decolorize various dyes and effluents by monitoring the change in its specific absorbance maxima every alternate day over a period of 6 days after the dye/effluents were added. The dye was added to a six day old culture growing in the B & K medium as described above and the time of addition was considered to be the 0 day. The final concentration of the dye in the medium on day zero (immediately after adding) was considered to be 100%. The extent of decolorization was recorded as residual color (in percentage). Trypan blue, aniline blue, remazol brilliant blue R, methylene blue, crystal violet, brilliant green, congo red and reactive orange 176 (concentration as mentioned in the Table 1b) were monitored at their absorbance maxima in B&K medium which were 599, 585, 597, 663, 589, 623, 486 and 499 nm respectively. Effluents like textile effluent A, B, MSW and black liquor were also monitored at their absorbance maxima in B&K medium, at 505, 663, 663 and 317 nm respectively.

Accordingly, among the dyes tested FIG. 2a shows that brilliant green was almost totally decolorized by day 4. Most of the dyes were decolorized by 50-60% on day 6. Reactive orange 176 (RO 176) was least degraded followed by Poly R 478. FIG. 2b shows that most of the synthetic blue dyes were decolorized by 50-90% by day 6. FIG. 2c shows that black liquor used at a concentration of 20%, lost about 80% of its color by day 6 whereas when used at 10% concentration about 50% of the color was removed. Regarding the decreased decolorization with decreasing concentration of black liquor we hypothesize that some low molecular weight compounds which act as mediators in laccase-catalyzed decolorization of effluents. Therefore, when we use lower concentration of the black liquor their concentration also is reduced and thus the decolorization percentage is also subsequently reduced.

FIG. 2d shows that molasses spent wash was totally decolorized by day 6 when used either at 10 or 20% concentration. FIG. 2e shows that textile effluent B was decolorized to a greater extent than textile effluent A. This trend was visible at both the concentrations.

Example 4

NIOCC 2a was grown in B&K medium prepared in sea water of 25 ppt salinity (the pH of the medium being 7.0) for 6 days. It was supplemented with 1% textile effluent B on day 6. The culture supernatant on day 12 was collected and concentrated two-fold. The concentrated enzyme was incubated with various dyes used at concentrations as given in Example 2 and the effluents were used at 10% only. The decolorization was monitored at 6 and 12 hours by incubating the samples in a water bath at 60° C. and pH 6.0 The absorbance maxima specific to that particular dye/effluent was monitored for 6 to 12 hours.

TABLE 2a

DECOLORIZATION OF DYES USING CULTURE SUPERNATANT OF NIOCC 2a PERCENT DECOLORIZATION

| DYE | HOURS | |
|---|---|---|
| | 6 | 12 |
| Trypan Blue (0.04%) | 22 | 25 |
| Aniline Blue (0.04%) | 55 | 40 |
| Methylene Blue (0.02%) | 3 | 5 |
| RBBR (0.04%) | 67 | 46 |
| Crystal Violet (0.02%) | 44 | 54 |
| Brilliant Green (0.02%) | 72 | 79 |
| Poly R (0.02%) | 21 | 43 |
| Congo Red (0.02%) | 54 | 47 |

TABLE 2b

DECOLORIZATION OF EFFLUENTS USING CULTURE SUPERNATANT OF NIOCC 2a PERCENT DECOLORIZATION

| EFFLUENT | HOURS | |
|---|---|---|
| | 6 | 12 |
| Textile effluent A (10%) | 9 | 11 |
| Textile effluent B (10%) | 14 | 22 |
| MSW (10%) | 34 | 33 |
| Black Liquor (10%) | 71 | 59 |

Accordingly, as shown in Table 2a, brilliant green was decolorized by almost 80% after 12 hours incubation with the enzyme. Among the effluents, as shown in Table 2b, black liquor was decolorized by 70% after 6 hours however by 12 hours, the color increased due to re-polymerization. This problem could be solved by using appropriate mediators. The decolorization efficiency of the enzyme could be increased by increasing the concentration of the enzyme.

Example 5

The temperature and pH optima of laccase activity were estimated to obtain maximum efficiency in detection of laccase. Laccase activity was estimated from pH 3 to 11. To obtain pH 3, glycine-HCl buffer was used, acetate buffer for pH 4 and 5, phosphate buffer for pH 5, 6 and 7. For pH 8 and 9, glycine-NaOH buffer and for pH 11 carbonate-bicarbonate buffers were used. The activity of laccase was tested from 5° to 90° C. Temperature was maintained using an electrically controlled cell holder of Shimadzu spectrophotometer (UV-2450) with enzyme kinetics software. Accordingly, the optimum pH for laccase activity was at pH 6 as shown in FIG. 3a and the optimum temperature was 60° C. as shown in FIG. 3b.

Example 6

The exopolymeric substance (EPS) of the fungus NIOCC 2a was prepared as follows: 1 liter of a 12 day old culture filtrate was frozen for 12 to 24 hours and allowed to thaw. The EPS precipitated on thawing and was removed by decantation. Methanol at a final concentration of 70% was added to the supernatant to further precipitate the remaining EPS from the culture supernatant. The precipitated EPS was collected by centrifugation and the pooled precipitate was lyophilized. To 10 mg of this EPS, various dyes and effluents were added at concentrations as given in example 2 and incubated at 60° C. with phosphate buffer at pH 6. The decolorization was monitored at 6 and 12 hours at the absorbance maxima specific to that particular dye/effluent. Accordingly, Table 3a indicates that most of the dyes showed 75-100% decolorization by 24 hours. Methylene blue and congo red were not decolorized to these extents.

TABLE 3a

DECOLORIZATION OF DYES USING EXOPLOYMERIC SUBSTANCE PRODUCED BY NIOCC 2a PERCENT DECOLORIZATION

| DYE | Hours | |
|---|---|---|
| | 12 | 24 |
| Trypan blue (0.04%) | 20 | 79 |
| Aniline blue (0.04%) | 46 | 75 |
| Methylene blue (0.02%) | 4 | 6 |
| RBBR (0.04%) | 19 | 100 |
| Crystal violet (0.02%) | 45 | 80 |
| Brilliant green (0.02%) | 2 | 90 |
| Poly R 478 (0.02%) | 33 | 90 |
| Congo red (0.02%) | 18 | 29 |
| RO 176 (0.015%) | 35 | 100 |

TABLE 3b

DECOLORIZATION OF EFFLUENTS USING
EXOPLOYMERIC SUBSTANCE PRODUCED BY NIOCC 2a
PERCENT DECOLORIZATION

| EFFLUENT | Hours | |
|---|---|---|
| | 12 | 24 |
| Text effluent A (10%) | 11 | 100 |
| Text effluent A (20%) | 15 | 62 |
| Text effluent B (10%) | 35 | 100 |
| Text effluent B (20%) | 3 | 100 |
| MSW (10%) | 12 | 100 |
| MSW (20%) | 2 | 100 |
| Black Liquor (10%) | 41 | 100 |
| Black Liquor (20%) | 51 | 100 |

Accordingly, table 3b shows that most of the effluents showed 100% decolourization by 24 hours with the exception of textile effluent A when used at a final concentration of 20% which showed about 60% decolorization. Exopolymeric substance produced by the fungus appears as large amorphous crystals around the fungal hyphae and they stain blue with acidic alcian blue. About 2.3 gms of EPS (dry weight) was obtained per liter of culture filtrate. The solubility of the EPS in different solvents show that EPS is soluble only in 1N HCl, $H_2SO_4$ and 10% EDTA (Table 4). The carbon, nitrogen and sulfur ratio, (of the EPS produced when the fungus was grown in 1% glucose with a Boyd and Kholmeyer medium base) was analysed in the CNS analyzer (Model NCS 2500/ S.no.9808136, Thermoquest Italia, S.P.A.) using MAG-1 and sulphan standards. The CNS ratio was 4.5:0.76:10. Thus the EPS appears to be a sulphated ploysacharide

TABLE 4

Solubility of EPS in different solvents

| S. No. | SOLVENT | SOLUBILITY |
|---|---|---|
| 1 | Distilled water | Not Soluble |
| 2 | Distilled water, on boiling | Not Soluble |
| 3 | 1N HCl | Soluble |
| 4 | $H_2SO_4$ | Soluble after addition |
| 5 | $CHCl_3$ | Not Soluble |
| 6 | DMSO ($Me_2SO$) | Not Soluble |
| 7 | 10% EDTA | Soluble after 12 hours |
| 8 | 5% EDTA | Not Soluble |
| 9 | 2.5% EDTA | Not Soluble |
| 10 | 1 N NaOH | Not Soluble |

The main advantages of the present invention are:
1. The fungus NIOCC 2a (MTCC 5159) can be grown on a large scale in simple nutrient medium containing peptone yeast extract and glucose in seawater of 25-35 parts per thousand salinity.
2. The production of laccase by the said fungus can be enhanced by incorporating dilute (~1%) textile dye in the above medium. Under these conditions the laccase activity is about 86000 U $L^{-1}$.
3. Optimum temperature for the laccase activity is at 60° C. and the optimum pH for its activity is 6.0.
4. The said fungus decolorizes about 80% of the color in black liquor added to the culture medium at 20% dilution by day 6. By day 2 about 50% of the color is removed.
5. Using the same fungus, molasses spent wash is totally decolorized by day 6 when added to the culture medium at 10 and 20% concentrations.
6. The same fungus decolorizes textile mill effluents by 50% on day 2 when added to the culture medium at 10 and 20% concentrations.
7. The said fungus also decolorizes several synthetic dyes in the culture medium to varying extents within 6 days.
8. The fungal biomass-free-culture supernatant also decolorizes all the above mentioned colored pollutants efficiently within 12 h of incubation at 50° C. and pH 6.0.
9. The exopolymeric substance (EPS) produced by the fungus on incubation with colored effluents was found to decolorize all the above mentioned colored effluents within 24 hours.

We claim:

1. A process for the decolorization of colored effluents using unidentified white-rot fungus NIOCC #2a deposited under accession number MTCC 5159, which comprises:
    a) culturing the unidentified white-rot fungus NIOCC #2a deposited under accession number MTCC 5159 in a medium prepared with sea water with salinity ranging from 25 to 35 parts per thousand and containing assimilable carbon and nitrogen source for a period of 6 to 12 days to obtain a fungal biomass;
    b) separating the fungal biomass from the culture medium of step (a) to obtain a cell-free supernatant;
    c) freezing the cell-free supernatant obtained in step (b) for 12 to 24 hours followed by thawing thereof to precipitate the exopolymeric substance (EPS) produced by the fungus;
    d) adding methanol to the supernatant obtained in step (c) to further precipitate the remaining EPS;
    e) pooling and centrifuging the precipitates obtained in step (c) and (d) to obtain exopolymeric substance and;
    f) contacting colored effluents optionally in a diluted form either with the fungal biomass obtained in step (a) or cell-free supernatant obtained in step (b) or the exopolymeric substance as obtained in step (e) for a period ranging from 6 hours to 6 days at temperature ranging from 30 to 60 degree C. and pH ranging from 3 to 6 thereby decolorizing said colored effluents.

2. A process as claimed in claim 1, wherein the colored effluents are preferably selected from the group consisting of black liquor from paper and pulp industries, molasses spent wash from distilleries, textile dye wastewaters and synthetic dyes.

3. A process as claimed in claim 1, wherein the fungus is cultured for at least 6 days to get maximum decolorization of colored effluents.

4. A process as claimed in claim 1, wherein the carbon source used for culturing the fungus is preferably selected from glucose, fructose, sorbitol and starch.

5. A process as claimed in claim 1, wherein the concentration of the carbon source for culturing the fungus is at least 1%.

6. A process as claimed in claim 1, wherein the nitrogen source used for culturing the fungus is preferably selected from peptone and ammonium tartarate.

7. A process as claimed in claim 1, wherein the concentration of the nitrogen source for culturing the fungus is at least 0.02%.

8. A process as claimed in claim 1, wherein the medium for culturing the fungus is preferably prepared with seawater having 25 parts per thousand salinity.

9. A process as claimed in claim 1, wherein the medium is optionally supplemented with 1% diluted textile mill effluent or copper sulphate at 2 mM concentration.

10. A process as claimed in claim 1, wherein the fungus is cultured for a period of at least 6 days.

11. A process as claimed in claim 1, wherein the dilution of the colored effluents is done in the range of 10 to 20%.

12. A process as claimed in claim 1, wherein contacting of the colored effluents with fungal biomass is carried out for a period of preferably 2 to 6 days at a temperature preferably 30 degree C and pH preferably 6.0.

13. A process as claimed in claim 1, wherein contacting of the colored effluents with the cell-free supernatant is carried out for a period of preferably 12 hours at a temperature preferably 60 degree C. and pH preferably 6.0.

14. A process as claimed in claim 1, wherein contacting of the colored effluents with the exopolymeric substance is carried out for a period of preferably 24 hours at a temperature preferably 60 degree C. and pH preferably 6.0.

15. A process as claimed in claim 1, wherein separation of the fungal biomass from the culture medium is carried out preferably by vacuum filtration or centrifugation.

16. A process as claimed in claim 1, wherein the fungal biomass is preferably immobilized on cubes or sheets of polyurethane foam or any other conventional known immobilization support.

17. A biologically cure culture of the unidentified white-rot fungus NIOCC #2a deposited under accession number MTCC 5159 with the following characteristics:
   a) filamentous and non-sporulating; and
   grows as white, fluffy mycelium on malt extract medium.

* * * * *